United States Patent
Dodd et al.

(10) Patent No.: US 7,000,133 B2
(45) Date of Patent: Feb. 14, 2006

(54) METHOD AND APPARATUS FOR CONTROLLING POWER STATES IN A MEMORY DEVICE UTILIZING STATE INFORMATION

(75) Inventors: James M. Dodd, Shingle Springs, CA (US); Narendra Khandekar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 10/104,676

(22) Filed: Mar. 22, 2002

(65) Prior Publication Data

US 2003/0182588 A1    Sep. 25, 2003

(51) Int. Cl.
 *G06F 1/26* (2006.01)
(52) U.S. Cl. .................. 713/324; 713/321; 713/323
(58) Field of Classification Search ............... 713/300, 713/310, 320, 321, 322, 323, 324; 711/100, 711/105
See application file for complete search history.

(56) References Cited

U.S. PATENT DOCUMENTS

| | | | |
|---|---|---|---|
| 5,715,465 A | | 2/1998 | Savage |
| 5,928,365 A | * | 7/1999 | Yoshida ...................... 713/324 |
| 6,112,306 A | | 8/2000 | Volk |
| 6,230,274 B1 | | 5/2001 | Stevens |
| 6,349,050 B1 | * | 2/2002 | Woo et al. ..................... 365/51 |
| 6,754,783 B2 | * | 6/2004 | Tsern et al. ................. 711/144 |

\* cited by examiner

*Primary Examiner*—Thuan Du
(74) *Attorney, Agent, or Firm*—Pillsbury Winthrop Shaw Pittman LLP

(57) ABSTRACT

A method of controlling power states in a memory device includes determining if a power-down command is received. A first lower power state is entered if the power-down command is received and the memory device is in a first state. A second lower power state is entered if the power-down command is received and if the memory device is in a second state. The second lower power state is lower than the first lower power state. The memory device remains in a normal operation power state if the power-down command is not received.

25 Claims, 6 Drawing Sheets

METHOD AND APPARATUS FOR CONTROLLING POWER STATES IN A MEMORY DEVICE UTILIZING STATE INFORMATION

BACKGROUND OF THE INVENTION

1. Field of the Invention

The present invention generally relates to use of active power management of a memory subsystem. More particularly, the present invention relates to how memory devices distinguish between various power states and how these power states are utilized.

2. Discussion of the Related Art

As computer devices and systems continue to advance and become more complex, effective and efficient power and thermal management of computer devices and systems have become more and more critical in system design and implementation. Because computer devices and systems can only operate properly and safely within certain electrical power and temperature ranges, it is important to ensure that there is sufficient power supplied to operate various devices when needed. In addition, it is also important to ensure that thermal conditions do not exceed some threshold levels that are considered safe for the operations of these various devices. In general, computer devices, such as memory devices, are designed to have different operating modes or power states that correspond to different levels of performance and power consumption. The different operating modes or power states may include, for example, active mode, standby mode, nap mode, etc.

Generally, devices operate faster in active mode (or normal mode) than they do in the other modes. However, devices also consume more power and generate more heat in the active mode than they do in the other modes. Keeping all devices in the system in active mode reduces operational latency, and therefore improves overall system performance. But, keeping all devices in active mode consumes more power and generates more heat. In addition, even if the system power supply source is sufficient to power all devices in the system, some of these devices may be idle anyway, and therefore, it would be a waste of resources to keep them in active mode all the time. System performance requirements and system power usage requirements need to be balanced. To maintain a balance between system performance and system power usage and heat generation, it is necessary to keep some number of devices in an inactive mode to reduce power usage and heat. Depending on the applications and the operational environment, the number of devices to be kept in inactive mode may vary.

The system constraints and tradeoffs described above with respect to computer devices in general apply equally to memory devices in a memory system. In their active (i.e., normal) or most power-consuming mode, memory devices, such as Dynamic Random Access Memory (DRAM) devices, operate faster than they do when they are in inactive mode (e.g., standby, or nap mode). However, DRAM devices in active mode also consume far more power than when in inactive mode. As a result, to maintain a balance between performance and power consumption (and heat generation), some fixed number of DRAM devices may need to be kept in an inactive mode to conserve power and to reduce heat generation.

The use of multiple power states in memory devices, and in a DRAM device specifically, has been utilized. With multiple power states, varying levels of lower-than-active mode power consumption may be utilized by the memory device. Typically, a memory controller provides specific information as to what power state, including which level (if applicable) of the lower-than-active mode power state, the memory device should enter. However, having the memory controller provide specific information as to which lower-than-active mode (or lower-than-normal mode) power state the memory device should enter increases the complexity of memory controller.

Accordingly, there is a need for a memory system where multiple power states may be utilized while reducing the complexity of a memory controller.

DETAILED DESCRIPTION

Figure 1:
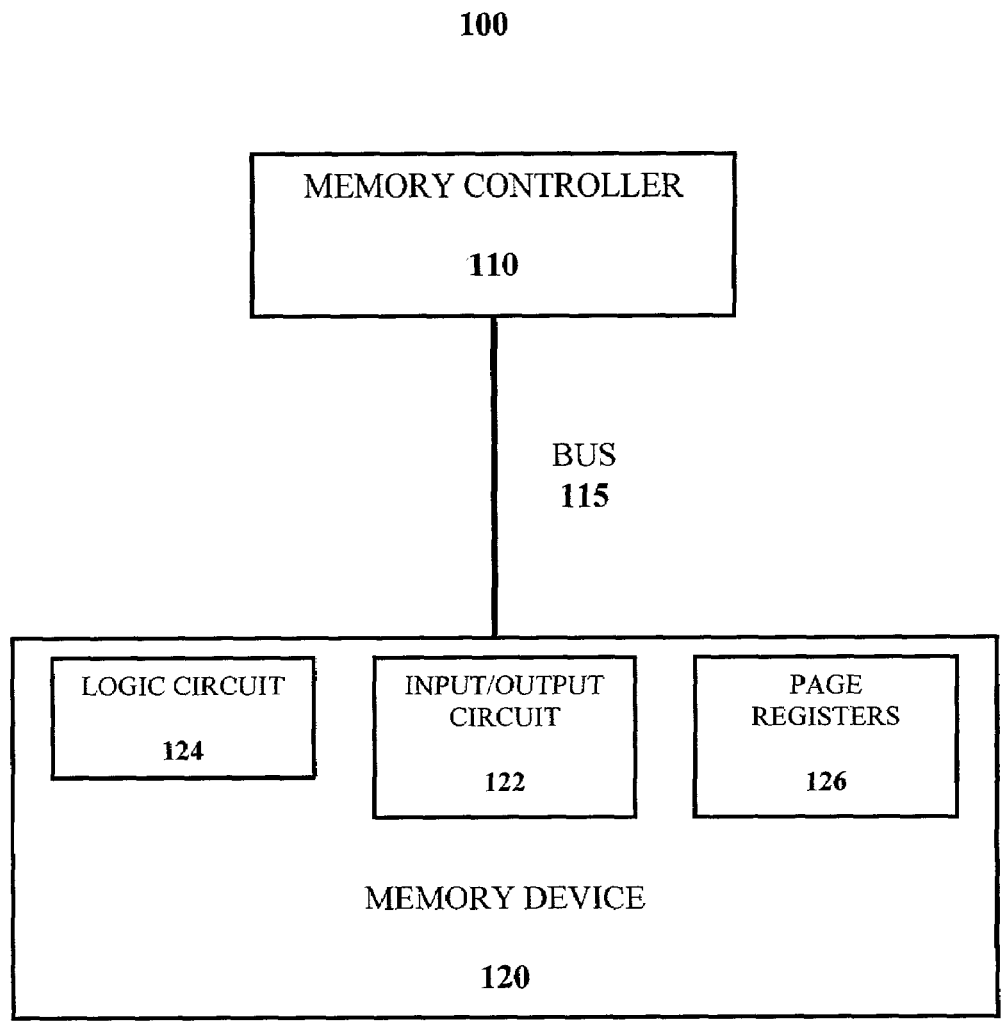
FIG. 1 illustrates a memory system according to an embodiment of the present invention.

FIG. 1 illustrates a memory system according to an embodiment of the present invention. The memory system 100 includes a memory controller 110, a memory device 120, and a bus 115 interconnecting the memory controller 110 with the memory device 120. The memory device 120 preferably includes an input/output (I/O) circuit 122, a logic circuit 124, and page registers 126. The memory device 120 may be a Dynamic Random Access Memory (DRAM) device. The input/output circuit (I/O) 122 is capable of transmitting and receiving data to/from the memory controller 110, including a power-down command from the memory controller 110. The page registers 126 are a common memory feature that are utilized to hold the most-recently used data for faster access by the memory device 120.

Figure 2:
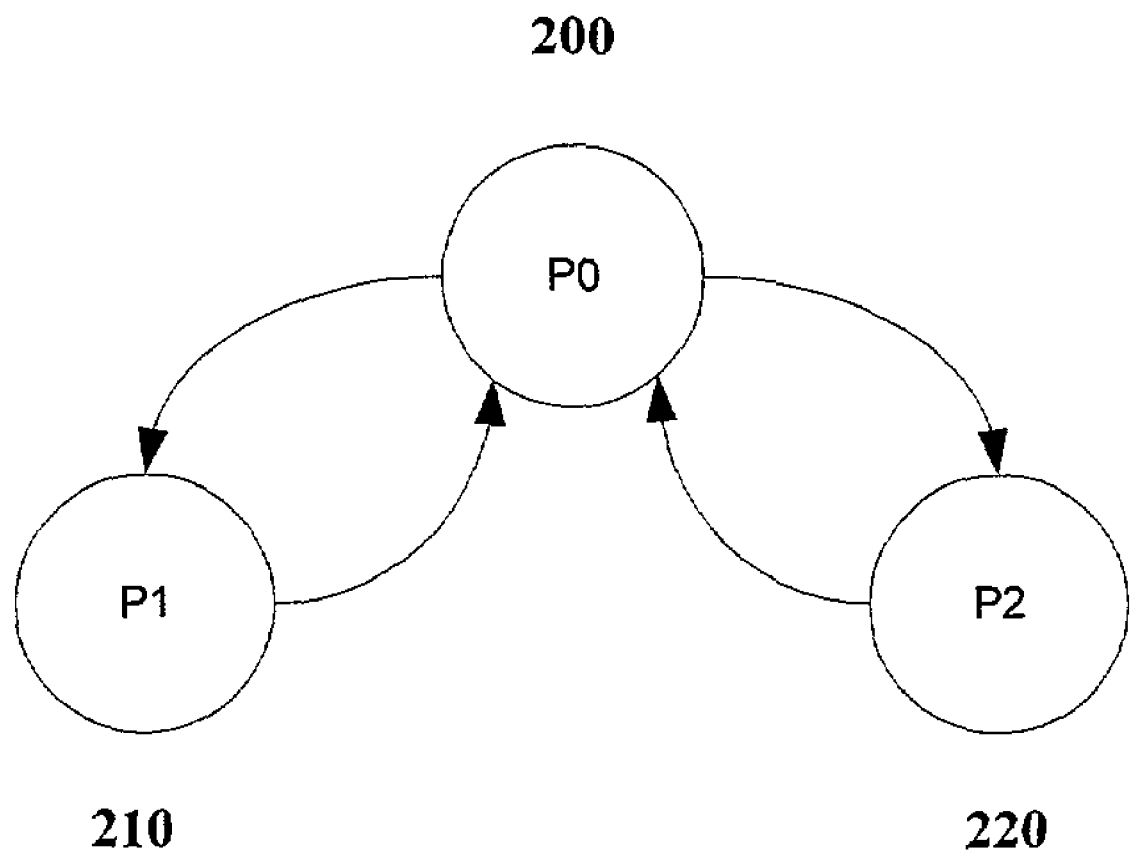
FIG. 2 illustrates a diagram of power states according to an embodiment of the present invention.

FIG. 2 illustrates a state diagram of power states according to an embodiment of the present invention. The memory device 120 may be in any one of a number of pre-defined power states. According to one embodiment of the present invention, the memory device 120 has three power states, P0 200 (normal or active-mode state), P1 210 (a first lower power state), and P2 (a second lower power state). Each power state represents a mode that the memory device 120 may enter to increase or reduce the amount of power being dissipated as a result of control information provided by the memory controller 110.

In one particular embodiment, P0 200 represents the highest power state. The P0 200 power state is the state the memory device 120 is in during normal operation where reads, writes, and other operations are performed by the memory device 120. The P1 210 power state represents a lower power state when the memory device 120 is not performing operations, and part of the circuitry in the memory device 120 may be disabled to reduce power. The P2 220 power state represents an even lower power state when more internal circuitry in the memory device 120 may be disabled. Because the P2 220 power state has more circuitry disabled, it takes longer to exit from the P2 220 power state back to the P0 200 normal power state. As illustrated in FIG. 2, the power states may transition from P0 200 to P1 210, and vice versa, as well as from P0 200 to P2 220, and vice versa.

According to one embodiment of the present invention, the memory device 120 includes page registers 126 to hold most-recently used data for faster access. A page is denoted as "open" if the page register 126 contains valid data that has not been written back into the main data array of the memory device 120. A page is denoted as "closed" if the page register 126 contains no valid data or the data in the page register 126 has already been written back. A memory device 120 may have one or more pages and page registers 126.

Figure 3:
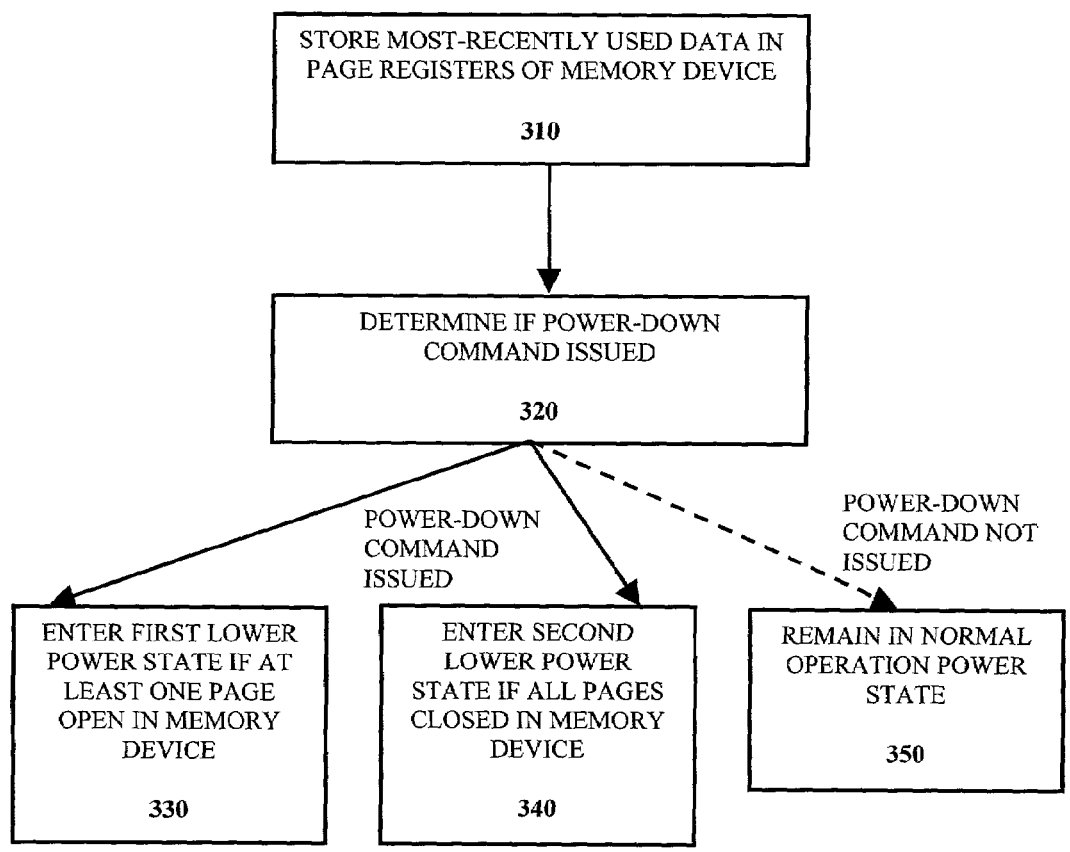
FIG. 3 illustrates a flow chart diagram of controlling power states in a memory device having page registers according to an embodiment of the present invention.

FIG. 3 illustrates a flow chart diagram of controlling power states in a memory device having page registers according to an embodiment of the present invention. In one embodiment, the memory device 120 is adapted to utilize non-specific control information (e.g., a power-down command issued from a memory controller 110) in conjunction with the state of the page registers 126 in the memory device 120 to determine to which power state the memory device 120 transitions from the P0 200 normal power state. Accordingly, most-recently used data is stored 310 in the page registers 126 of the memory device 120. Logic contained in, for example, the logic circuit 124 of the memory device 120 determines 320 whether a power-down command has been issued. If the power-down command has been issued, the memory device 120 enters 330 a first lower power state 210 if at least one page is open in the memory device 120. If the power-down command has been issued, the memory device 120 enters 340 a second lower power state 220 if all pages are closed in the memory device 120. In this example, the second lower power state 220 is lower than the first lower power state 210. If no power-down command has been issued, then the memory device 120 remains 350 in the normal operation power state 200. However, these rules do not govern transitions from the first power state 210 or from the second power state 220 back to the normal operation power state 200.

By ensuring that all pages are closed before entering the P2 220 second lower power state, more circuitry in the memory device 120 may be disabled. Moreover, because it is understood that exiting the P2 220 second lower power state requires more time, the fact that the pages are closed is acceptable. It takes time to re-open the pages, and the memory device 120 has more time when exiting the P2 220 power state anyway. This type of power/latency trade-off is advantageous for active power-management schemes.

For example, a memory device 120 may have clocking circuitry that is utilized when performing a read or a write operation. In the P2 220 power state, this circuitry may be disabled. Upon transition from the P2 220 power state back to the P0 200 normal power state, this circuitry is re-enabled, but it takes a certain amount of time before the circuitry becomes stable. However, the memory controller 110 may still perform other operations, such as re-opening the pages, while the clock circuitry becomes stable again. Thus, using the state of the pages to control the power state is very useful.

Figure 4:
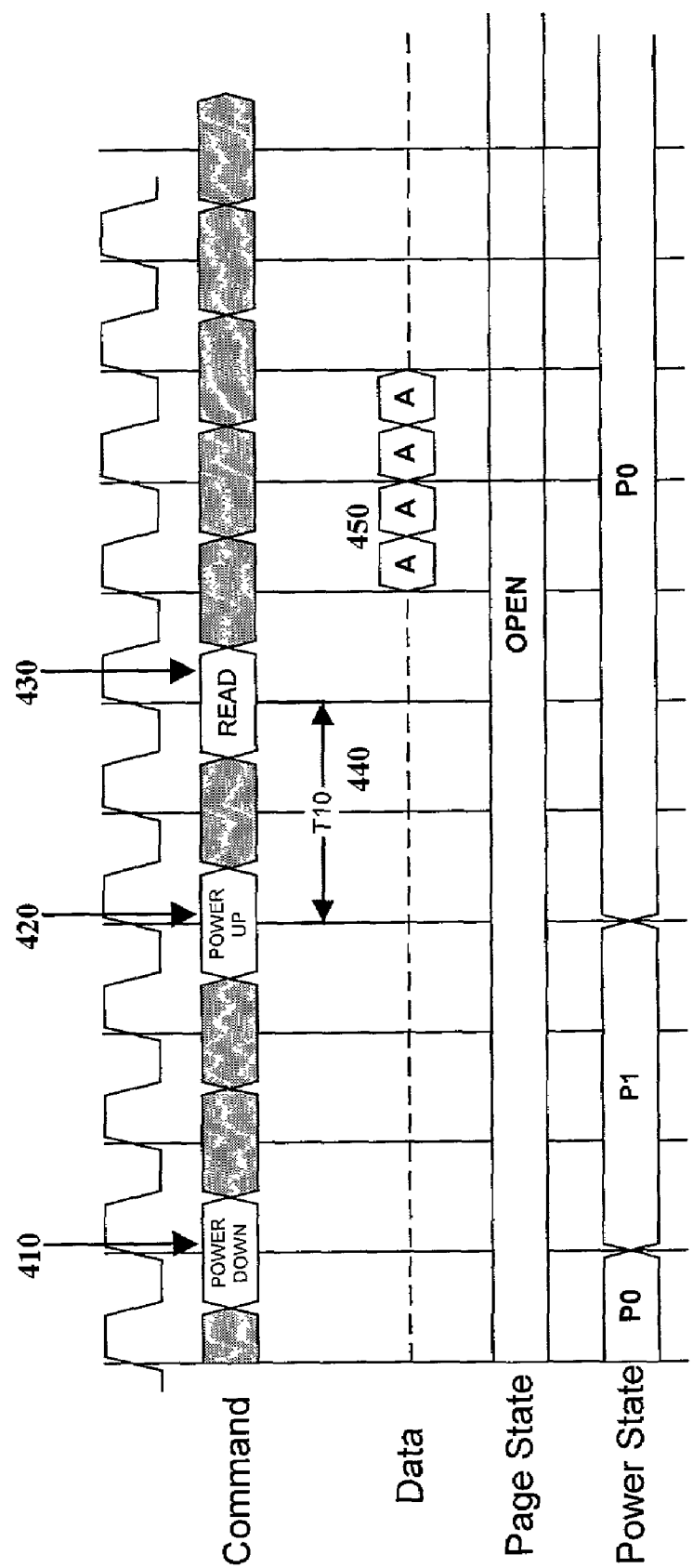
FIG. 4 illustrates a timing waveform diagram of a memory device utilizing a first lower power state according to an embodiment of the present invention.

FIG. 4 illustrates a timing waveform diagram of a memory device utilizing a first lower power state according to an embodiment of the present invention. FIG. 4 illustrates an example of how the memory device 120 enters and exists the P1 210 first lower power state. A power-down command 410 is issued by the memory controller 110 to the memory device 120. The memory device enters the P1 210 first lower power state upon the determination that one or more pages in the memory device 120 are open (i.e., the page state). On the third clock following the power-down command 310, a power-up command 420 is issued by the memory controller 110 to the memory device 120. Following the power-up command 420, the power state of the memory device 120 is now in the P0 200 normal power state. However, there is a latency T10 440 period involved in the transition from the P1 210 power state to the P0 200 normal power state, which in this particular example, is two clock cycles, before a command, such as a read command 430, may be executed. Data 450 is outputted onto the bus 115 by the memory device 120 in response to the read command 430.

Figure 5:
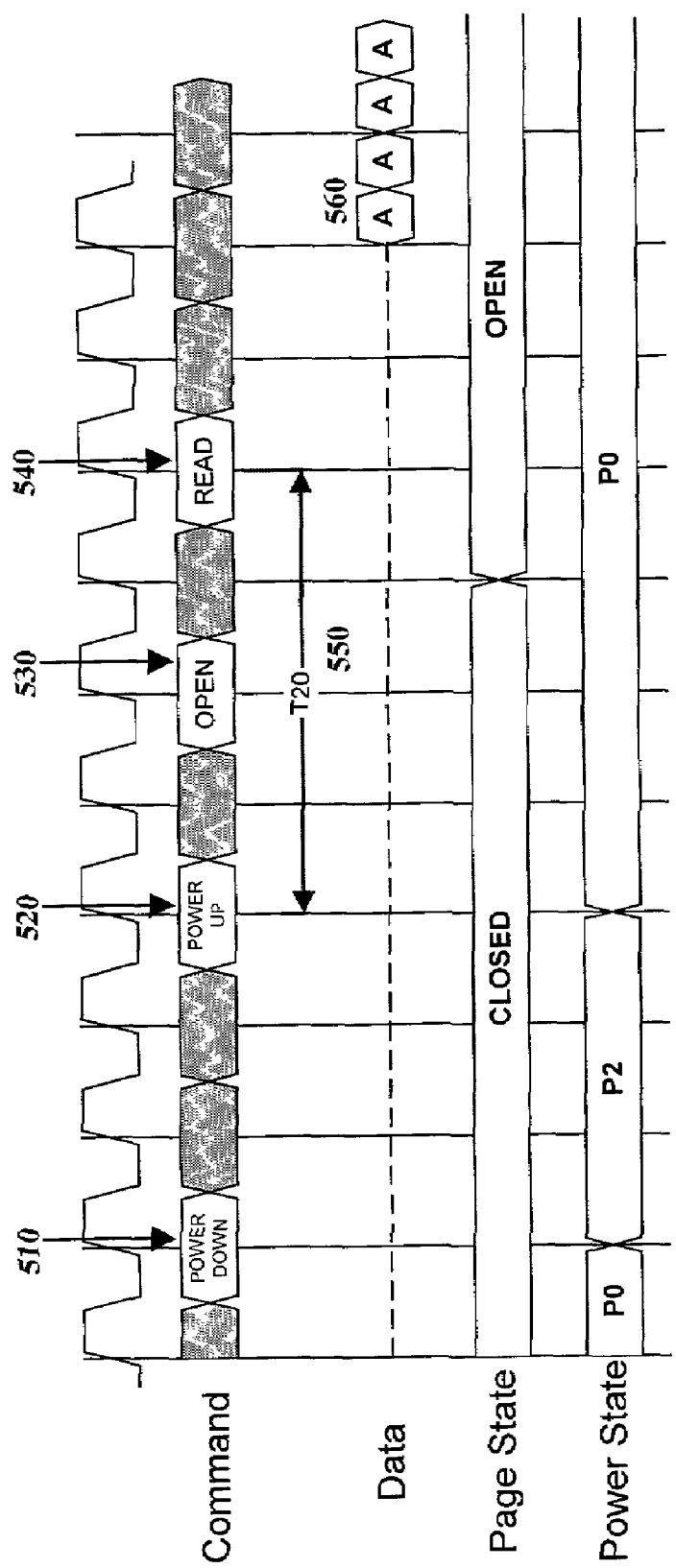
FIG. 5 illustrates a timing waveform diagram of a memory device utilizing a second lower power state according to an embodiment of the present invention.

FIG. 5 illustrates a timing waveform diagram of a memory device utilizing a second lower power state according to an embodiment of the present invention. FIG. 5 illustrates an example of how the memory device 120 enters and exists the P2 220 second lower power state. A power-down command 510 is issued by the memory controller 110 to the memory device 120. The memory device 120 enters the P2 220 second lower power state upon the determination that all pages in the memory device 120 are closed (i.e., the page state). On the third clock following the power-down command 510, a power-up command 520 is issued by the memory controller 110 to the memory device 120. Following the power-up command 520, the power state of the memory device 120 is now in the P0 200 normal power state, and an open command 530 may be issued to re-open the pages, all during the T20 latency 550 period involved due to the transition from the P2 220 power state to the P0 200 normal power state. In this particular example, the T20 latency 550 is four clock cycles before a command, such as a read command 540, may be executed. Data 560 is outputted by the memory device 120 onto the bus 115 in response to the read command 540. The T10 latency 440 and the T20 latency 550 illustrate that transitioning from the P1 210 state and the P2 220 state may require a differing number of clock cycles.

Figure 6:
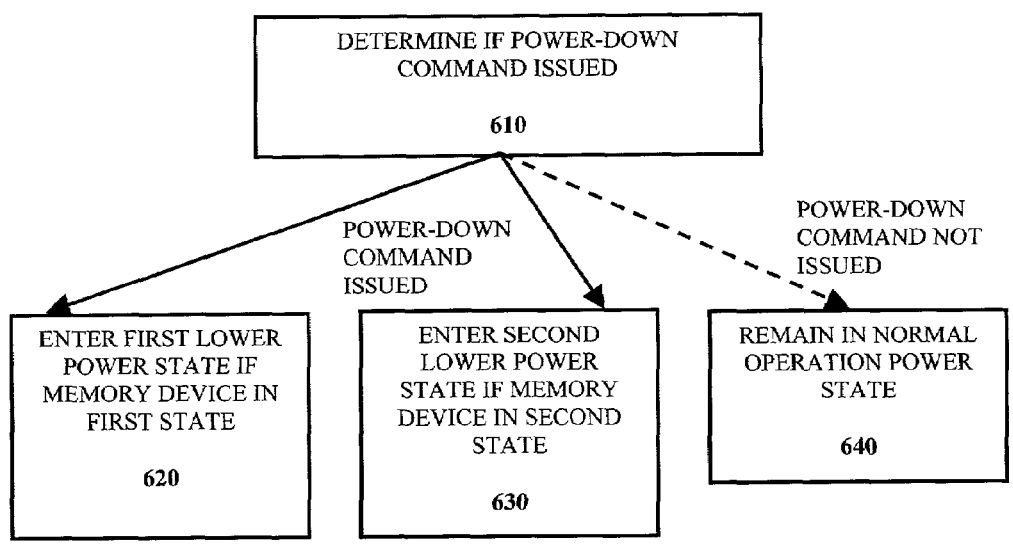
FIG. 6 illustrates a flow chart diagram of controlling power states in a memory device based on state information of the memory device according to an embodiment of the present invention.

FIG. 6 illustrates a flow chart diagram of controlling power states in a memory device based on state information of the memory device according to an embodiment of the present invention. In addition to utilizing the state of the page registers 126 to determine which power state the memory device 120 enters, any other state information of the memory device 120 may be utilized. Examples of such state information may include the state of any type of special input/output circuit that is enabled, which could slow down the exit time from a low-power state. Another example would be utilizing information such as how many pages are open. For example, there may be more than two lower power states, and the memory device 120 may enter a deeper power-down state (from a first power state) if less than half of the possible pages are open.

Basically, the memory device 120 determines 610 whether a power-down command has been issued. If the power-down command has been issued, the memory device 120 enters 620 a first lower power state if the memory device 120 is in a first state. If the power-down command has been issued, the memory device 120 enters 630 a second lower power state if the memory device 120 is in a second state. Moreover, if the power-down command has been issued, the memory device 120 may enter a third lower power state if the memory device 120 is in a third state. Any number of lower power states corresponding to states of a memory device 120 may be utilized. If no power-down command has been issued, then the memory device 120 remains 640 in the normal operation power state.

Accordingly, the present invention provides three or more power states for a memory device 120 without the memory controller 110 having to provide specific control information to transition to a given power state. The present invention provides a memory controller 110 with more control without additional commands or signal pins. In one specific embodiment, the use of page information allows a DRAM device to optimize the power management without the memory controller 110 having to generate specific commands.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of controlling power states in a memory device, comprising:
storing most-recently used data in page registers of the memory device;
determining if a power-down command is received;
entering a first lower power state if the power-down command is received, at least one page in the memory device is open, and at least one page in the memory device is closed;
entering a second lower power state if the power-down command is received and if all pages in the memory device are closed, wherein the second lower power state is lower than the first lower power state; and
remaining in a normal operation power state if the power-down command is not received.

2. The method according to claim 1, further including receiving the power-down command from a memory controller.

3. The method according to claim 1, wherein the memory device is a Dynamic Random Access Memory (DRAM) device.

4. The method according to claim 1, wherein more circuitry in the memory device is disabled in the second lower power state than in the first lower power state.

5. The method according to claim 1, wherein the power-down command provides non-specific control information regarding a power state.

6. A memory device, comprising:
page registers to store most-recently used data;
an input/output circuit to receive a power-down command; and
a logic circuit to determine if the power-down command is received, to enter a first lower power state if the power-down command is received, at least one page in the memory device is open and at least one page in the memory device is closed, to enter a second lower power state if the power-down command is received and if all pages are closed, and to remain in a normal operational power state if the power-down command is not received, wherein the second lower power state is lower than the first lower power state.

7. The memory device according to claim 6, wherein the memory device is a Dynamic Random Access Memory (DRAM) device.

8. The memory device according to claim 6, wherein more circuitry in the memory device is disabled in the second lower power state than in the first lower power state.

9. The memory device according to claim 6, wherein the power-down command provides non-specific control information regarding a power state.

10. A program code storage device, comprising:
a machine-readable storage medium;
machine-readable program code, stored on the machine-readable storage medium, having instructions to
store most-recently used data in page registers of a memory device,
determine if a power-down command is received,
enter a first lower power state if the power-down command is received at least one page in the memory device is open, and at least one page in the memory device is closed,
enter a second lower power state if the power-down command is received and if all pages in the memory device are closed, wherein the second lower power state is lower than the first lower power state, and
remain in a normal operation power state if the power-down command is not received.

11. The program code storage device according to claim 10, wherein the machine-readable program code further includes instructions to receive the power-down command from a memory controller.

12. The program code storage device according to claim 10, wherein the memory device is a Dynamic Random Access Memory (DRAM) device.

13. The program code storage device according to claim 10, wherein more circuitry in the memory device is disabled in the second lower power state than in the first lower power state.

14. The program code storage device according to claim 10, wherein the power-down command provides non-specific control information regarding a power state.

15. A memory system, comprising:
a memory controller to issue a power-down command;
a memory device, having
page registers to store most-recently used data,
an input/output circuit to receive the power-down command, and
a logic circuit to determine if the power-down command is received, to enter a first lower power state if the power-down command is received, at least one page in the memory device is open and at least one page in the memory device is closed, to enter a second lower power state if the power-down command is received and if all pages are closed, and to remain in a normal operational power state if the power-down command is not received, the second lower power state being lower than the first lower power state, wherein the memory controller issues the power-down command irrespective of a power state of the memory device; and
a interconnection between the memory controller and the memory device.

16. The memory system according to claim 15, wherein the memory device is a Dynamic Random Access Memory (DRAM) device.

17. The memory system according to claim 15, wherein more circuitry in the memory device is disabled in the second lower power state than in the first lower power state.

18. The memory system according to claim 15, wherein the power-down command provides non-specific control information regarding a power state.

19. A method of controlling power states in a memory device, comprising:
- determining if a power-down command is received;
- entering a first lower power state if the power-down command is received, at least half of all pages in the memory device are open, and at least one page in the memory device is closed;
- entering a second lower power state if the power-down command is received and less than half of all pages in the memory device are open, wherein the second lower power state is lower than the first lower power state;
- entering a third lower power state if the power-down command is received and all of the pages in the memory device are closed, wherein the third lower power state is lower than the second lower power state; and
- remaining in a normal operation power state if the power-down command is not received.

20. The method according to claim 19, wherein the memory device is a Dynamic Random Access Memory (DRAM) device.

21. The method according to claim 19, further including storing most-recently used data in page registers of the memory device, wherein in the first state, at least one page in the memory device is open.

22. The method according to claim 19, further including storing most-recently used data in page registers of the memory device, wherein in the second state, all pages in the memory device are closed.

23. The method according to claim 19, further including storing most-recently used data in page registers of the memory device.

24. The method according to claim 19, wherein more circuitry in the memory device is disabled in the second lower power state than in the first lower power state.

25. The method according to claim 19, wherein the power-down command provides non-specific control information regarding a power state.

* * * * *